United States Patent [19]

Pugh

[11] Patent Number: 5,169,200

[45] Date of Patent: Dec. 8, 1992

[54] PICKUP TRUCK STORAGE BOX

[76] Inventor: George D. Pugh, P.O. Box 914, Pioneer, Calif. 95666

[21] Appl. No.: 875,261

[22] Filed: Apr. 27, 1992

[51] Int. Cl.$^5$ ................................................ B60R 9/00
[52] U.S. Cl. ................................ 296/37.6; 224/42.42
[58] Field of Search ...................... 296/37.6; 224/42.42

[56] References Cited

U.S. PATENT DOCUMENTS

| | | | |
|---|---|---|---|
| 2,697,631 | 12/1954 | Miller | 296/23 |
| 4,451,075 | 5/1984 | Canfield | 296/37.6 |
| 4,580,827 | 4/1986 | Feagan | 296/37.6 |
| 4,749,226 | 6/1988 | Heft | 296/37.6 |
| 4,750,773 | 6/1988 | Chapline et al. | 296/37.6 |
| 4,770,330 | 9/1988 | Bonstead et al. | 296/37.6 X |
| 4,828,312 | 5/1989 | Kinkel et al. | 296/37.6 |
| 4,917,429 | 4/1990 | Geiger | 296/37.6 |
| 4,938,398 | 7/1990 | Hallsen | 224/42.42 |
| 5,044,848 | 9/1991 | Burnham | 410/102 |

Primary Examiner—Johnny D. Cherry
Assistant Examiner—Joseph D. Pape
Attorney, Agent, or Firm—Joseph E. Gerber

[57] ABSTRACT

A pickup truck storage box for use in the cargo bed of a pickup truck is disclosed. It has left and right edge brackets that receive left and right upstanding box panels; a center stake that fits between inner edges of the box panels to keep the outer edges of the box panels seated in the edge brackets; a channel member that fits over the upper edge of the truck bed's forward wall; a hinged, locking lid attached to the channel member; a hinged cross-member between the channel member and the upper, inner edges of the box panels; and, cap strips that cover the top edges of the box panels.

36 Claims, 6 Drawing Sheets

PICKUP TRUCK STORAGE BOX

BACKGROUND OF THE INVENTION

1. Field Of The Invention

The present invention relates generally to storage enclosures for use in or on motor vehicles, and more specifically to a storage box for use in the cargo bed of a pickup truck.

2. Description Of The Related Art

The cargo bed of a pickup truck, while being a convenient place to carry all manner of items, presents those items to plain view, thereby encouraging theft. An open cargo bed also exposes all contained therewithin to weather. Thus, many storage boxes for installation in a pickup truck's cargo bed have been proposed. The closely related prior storage boxes are of several types, each type having inherent drawbacks. For example, the following patents propose mounting a storage box rearward in a cargo bed, adjacent the tailgate: U.S. Pat. No. 4,451,075 issued to Canfield in 1984; U.S. Pat. No. 4,749,226 issued to Heft in 1988; U.S. Pat. No. 4,828,312 issued to Kinkel, et al. in 1989; and, U.S. Pat. No. 4,938,398 issued to Hallsen in 1990. Such rearward-mounted boxes, while in place, make it impossible to load items through the truck's tailgate. In contrast, a storage box mounted against the forward wall of a cargo bed is disclosed in U.S. Pat. No. 4,750,773 issued to Chapline, et al. in 1988. However, the Chapline, et al. box is secured to the cargo bed with hinges and screws, and therefore appears time-consuming to install and remove. Even when folded flat, a panel of the Chapline, et al. storage box obstructs the floor surface of the bed making it difficult to slide elongate items forward, thereby effectively reducing the usable space of the bed.

Thus, it appears there exists a need for a pickup truck storage box adapted to be easily installed at the forward end of the truck's cargo bed. And, such a box should be just as easily removed to permit the greatest versatility in the truck's carrying capacity.

SUMMARY OF THE INVENTION

The pickup truck storage box of the present invention is adapted to overcome the above-noted shortcomings and to fulfill the stated needs. It comprises both a kit for constructing a storage box, as well as such a storage box in combination with a pickup truck. The kit, in its essence, includes right and left edge brackets; right and left box panels; means for separating the panels; and, a lid. In combination, these elements are installed in the cargo bed of a pickup truck as follows. The right and left edge brackets are affixed in a generally vertical orientation to opposing side walls of the truck's bed. The box panels are disposed in a single plane generally perpendicular to the truck bed's side walls, with the outer edge of each panel being seated in its respective edge bracket. Means between the opposed inner edges of the panels separates the panels, thereby causing the panels' outer edges to remain securely mated with the edge brackets. And, the lid is removably seated atop top edges of the box panels, as well as atop the truck bed's forward and side walls.

This results in an extremely versatile storage box which is able to be easily assembled and installed, and just as easily disassembled again and removed. Only the brackets need remain semipermanently affixed to the truck.

Thus, it is an object of the present invention to provide a pickup truck storage box which is easy to install and remove.

It is a further object of the present invention to provide a forward-mounted truck storage box that, when removed, leaves no residual hardware or other obstructions to sliding items forward in the truck's cargo bed.

Yet another object of this invention is to provide a truck storage box that cooperates with the existing structure of a pickup truck's cargo bed to yield a simple, yet strong and secure, storage box.

And, an additional object of this invention is to provide a disassemlable truck storage box that, when disassembled, stows in minimal space.

Still further objects of the inventive truck storage box disclosed herein will be apparent from the drawings and following detailed description thereof.

DESCRIPTION OF THE PREFERRED EMBODIMENT

Figure 1:
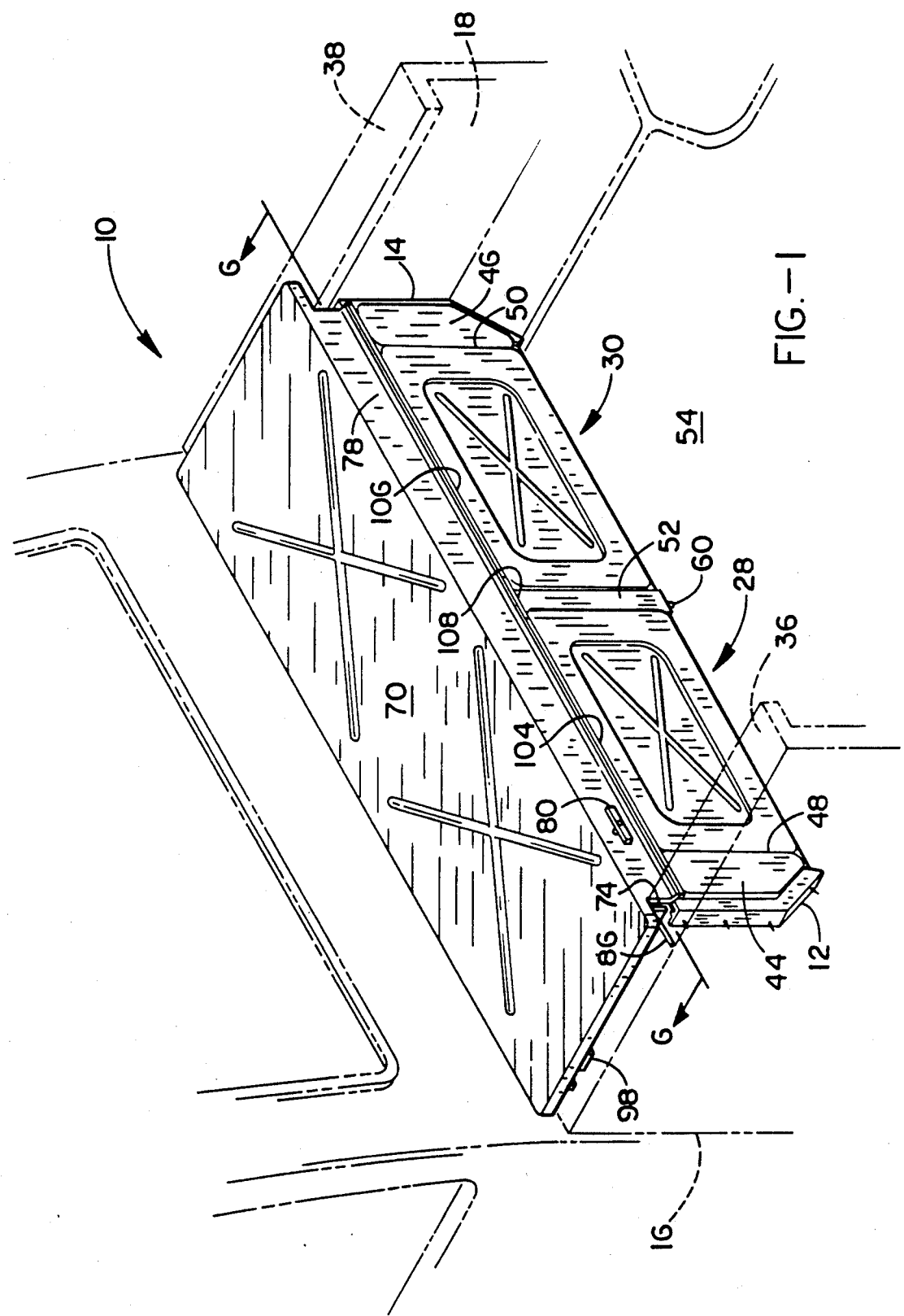
FIG. 1 is a perspective view of the storage box of the present invention installed against the forward wall of a pickup truck's cargo bed.
Figure 2:
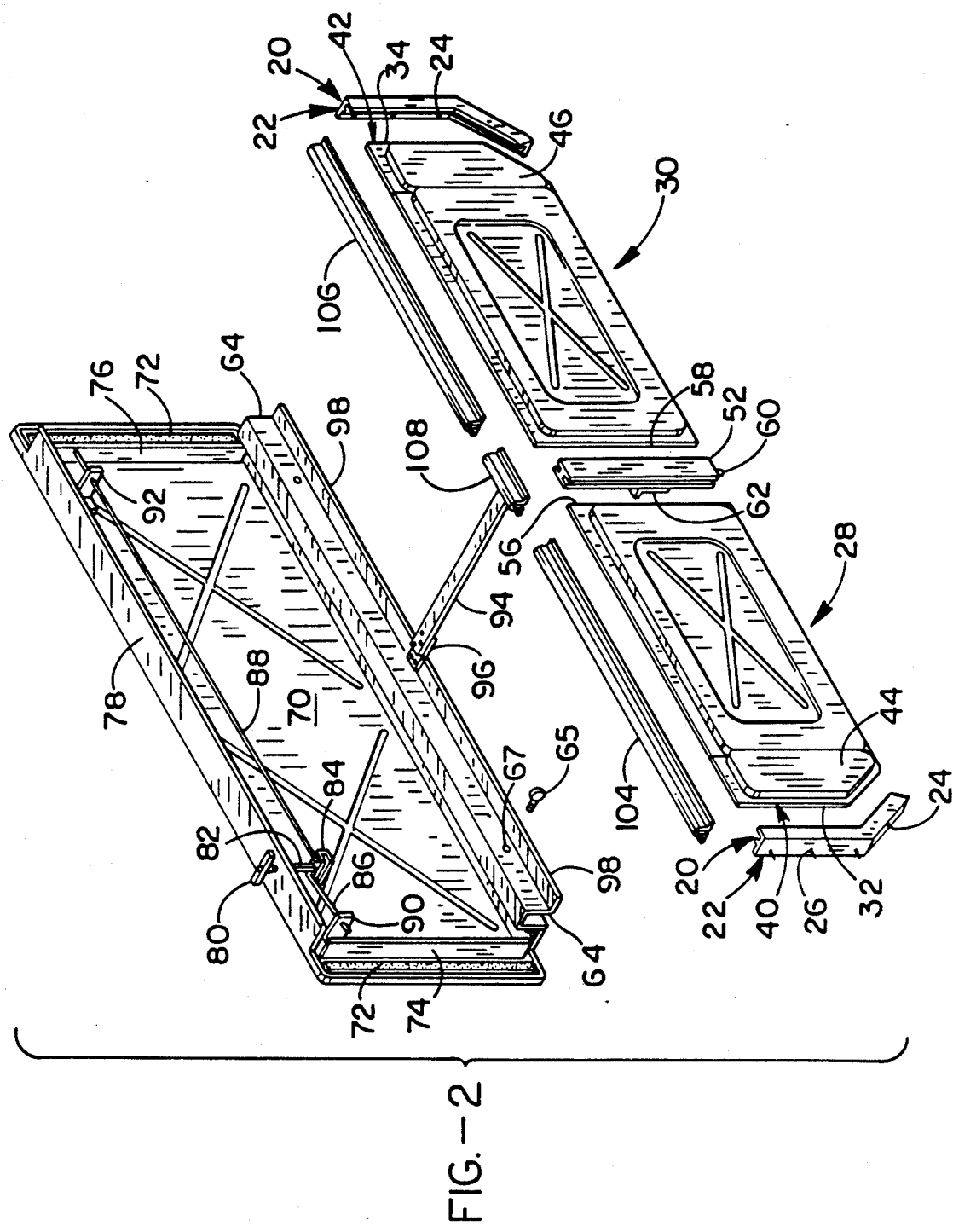
FIG. 2 is an exploded perspective view of the pickup truck box of FIG. 1.

Referring now specifically to the drawings, FIGS. 1 and 2 show the pickup truck storage box of the present invention, which is identified generally therein with reference numeral 10. The elements of storage box 10 may be in the form of a kit for after-market installation, or they may be part of a pickup truck's original hardware.

Right and left edge brackets, 12 and 14, are mounted in an opposed, generally vertical orientation on right and left cargo bed walls 16 and 18 of a pickup truck. As can be seen from inspection of the upper ends of edge brackets 12 and 14 in FIG. 2, their cross-sections include a U-shaped portion 20 flanked by a mounting strip 22. Edge brackets 12 and 14 are secured to walls 16 and 18 by driving conventional fasteners such as sheet metal screws 24 through apertures 26 in strip 22 and into truck walls 16 and 18. Thus, edge brackets 12 and 14 are semipermanently secured to walls 16 or 18, which is to say they are securely affixed but may be removed and installed in a different location if desired. Other conventional fasteners such as rivets, or nuts and bolts, may be used as necessary. Edge brackets 12 and 14 may be constructed of plastic, metal or other suitably rigid materials. However, it is preferred that the material used be able to be bent as required to match contours in truck walls, such as is evident from inspection of the lower portions of edge brackets 12 and 14 in FIG. 2. Alternatively, the edge brackets may be pre-shaped to match the contours of the truck walls of a particular brand of pickup truck.

It is also contemplated that edge brackets may be formed as an integral part of a truck's cargo bed walls. This might be the case if the inventive storage box is offered as original equipment from a truck manufacturer Right and left box panels 28 and 30 are held in an upright posture by edge brackets 12 and 14. Box panels 28 and 30 are planar, and each has a roughly rectilinear shape. They are preferably constructed of vacuum-formed ABS plastic and include structural contours such as ridges and depressions (unidentified and unnumbered in the drawings) to enhance their rigidity.

Figure 3:
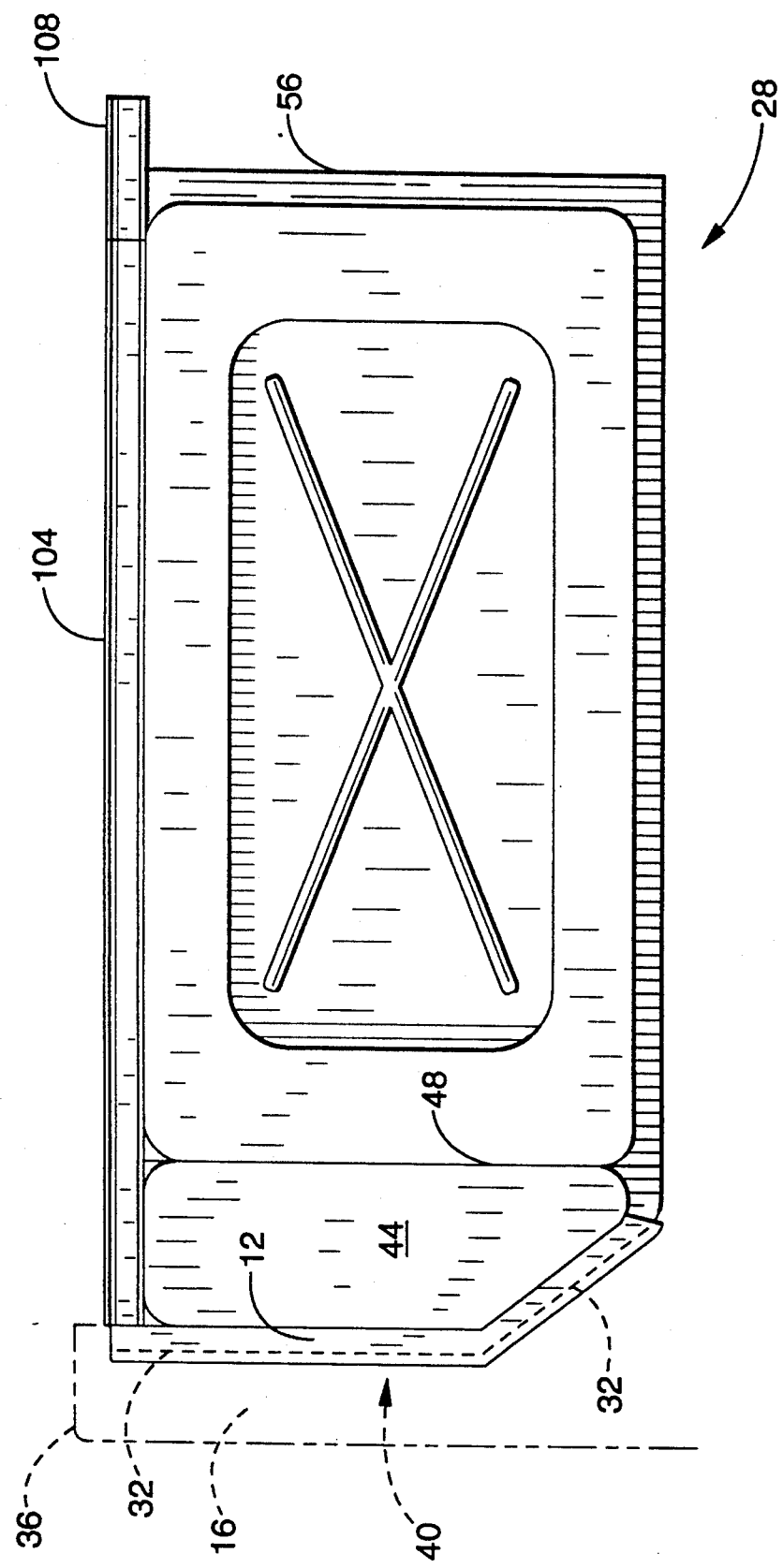
FIG. 3 is an elevational view of the rear face of the left box panel and its related hardware, with the lid of the storage box raised and not shown, showing how the panel's outer ends fit snugly beneath the cargo bed's rails.

Right and left box panels 28 and 30 include outer edges 32 and 34, respectively, which seat in edge brackets 12 and 14, respectively. The shape and thickness of each outer edge (32 and 34) permits that edge to fit snugly into the U-shaped channel in its respective bracket, 12 or 14. As is evident from inspection of the drawings, and especially FIG. 3, edge brackets 12 and 14 reside beneath upper, inwardly-curved rails which are atop cargo bed walls 16 and 18. (The right and left rails are numbered 36 and 38 herein.) Thus, the outer ends, 40 and 42, of right and left box panels 28 and 30 are prevented from being drawn upward when seated in edge brackets 12 and 14.

Outer ends 40 and 42 of the box panels may comprise removable portions 44 and 46, each bound to the primary portion of its respective box panel at a seam (the right and left seams being numbered 48 and 50, respectively). The purpose of outer ends 40 and 42 being separate is to permit them to accommodate the interior contours of the cargo bed of the specific brand of truck with which storage box 10 will be used. If the outer ends are intended to be selected from a kit by an end user, any conventional fasteners such as screws, nuts and bolts, rivets, staples or the like may be used at seams 48 and 50 to fasten end portions 44 and 46 in place. Or, if the choice of which brand truck will be accommodated is to be made during manufacturing, seams 48 and 50 may be fastened by more permanent means such as welding, or the like, if desired.

Figure 5:
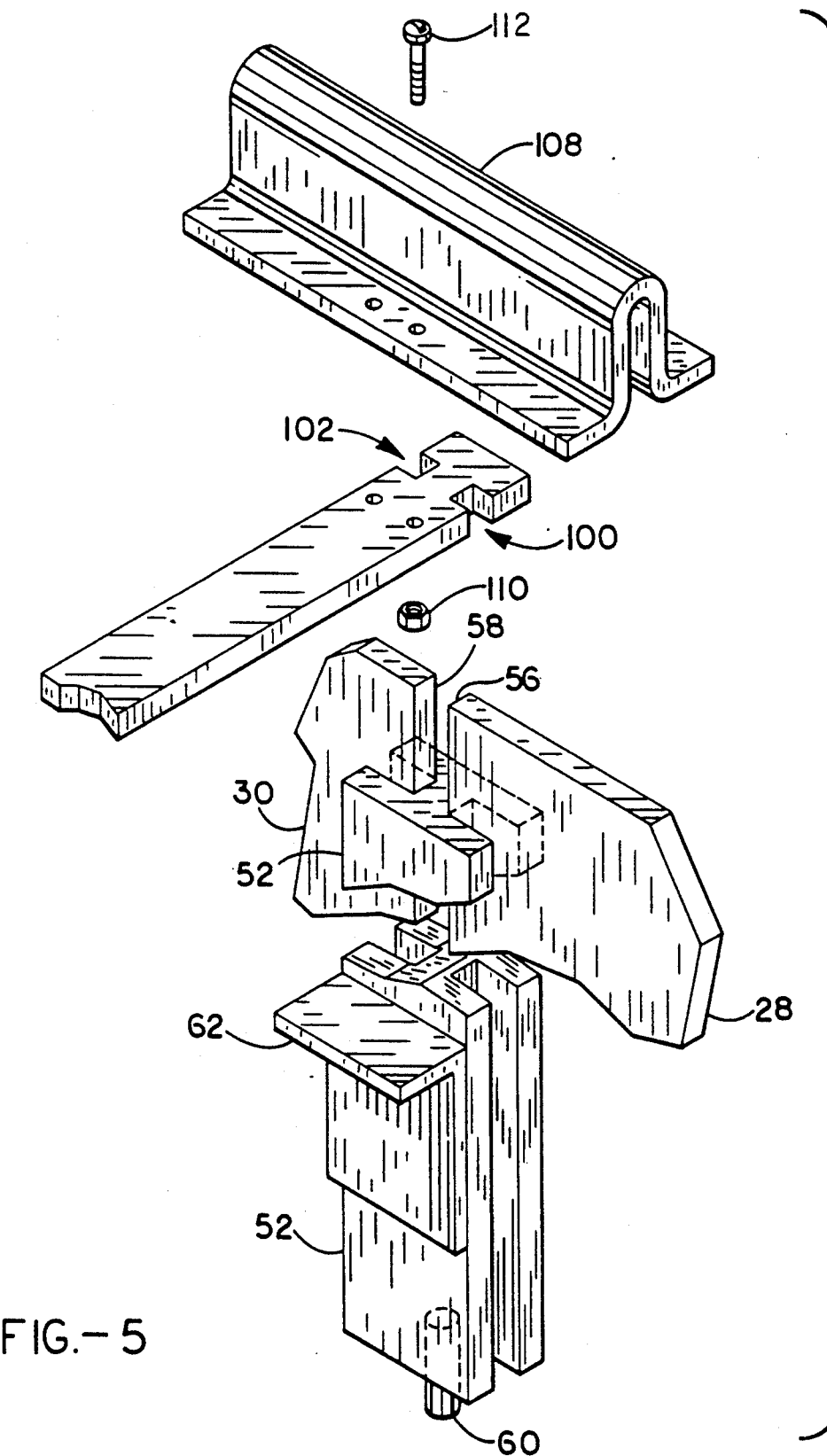
FIG. 5 is an enlarged, exploded, perspective view of the notched distal end of the cross-member showing its attached cap strip segment, illustrating how this distal end seats atop the center stake and engages the upper inner edges of the box panels.

To keep outer ends 40 and 42 beneath upper, inwardly-curved rails 36 and 38, thereby preventing them from being drawn upward when seated in edge brackets 12 and 14, means for separating and holding panels 28 and 30 outward is needed. These means are provided by center stake 52. Center stake 52 has an H-shaped cross-section as is evident from inspection of FIGS. 2 and 5. Center stake 52's length is just slightly less than the height to which upstanding box panels 28 and 30 rise from the truck bed's floor 54. Stake 52, essentially, describes two opposed channels (unnumbered) that receive opposed inner edges 56 and 58 of the right and left box panels. At its inner-most portion (what might be described as "the cross-bar of the H") stake 52 has a width between its channels sufficient to fill the space between right and left box panels' opposed inner edges 56 and 58 when the panels' outer edges are securely mated with their respective edge brackets. Thus, the stake and box panels, together, form a wall across the bed of the truck.

Center stake 52 has a cylindrical pin 60 at its lower terminus, pin 60 being adapted to be received by an aperture (not shown) in the truck bed's floor 54. This aperture must have a diameter slightly larger than the cross-sectional diameter of pin 60. Thus, stake 52 keeps the box panels outward and engaged with the edge brackets, so that the outer ends of this "wall" cannot be moved fore and aft in the truck bed. And, pin 60 keeps the lower, center-most portion of the described wall from being moved fore and aft.

Tab 62 projects from the forward surface of center stake 52, acting as a grip to aid in stake 52's being seated, and removed from, between the inner edges of the box panels.

Figure 4:
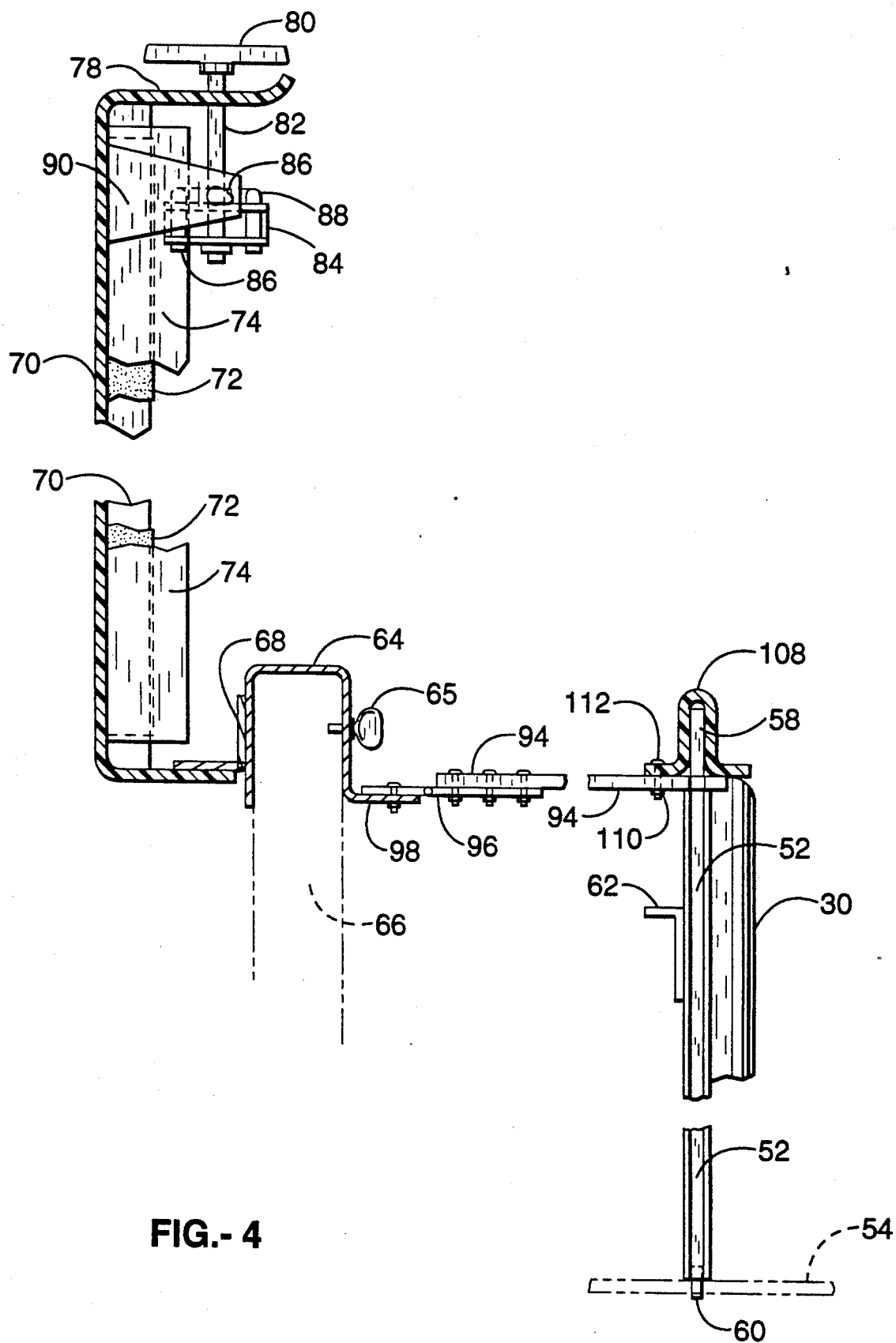
FIG. 4 is a left side sectional view of the storage box shown in FIG. 1, the box having its lid in an open posture showing the mounting of the hinges for the lid and cross-member.

A channel member 64 having a U-shaped cross-section nests atop the truck bed's forward wall 66 and closely matches the wall's length. See FIGS. 2 and 4. Channel member 64 may be fastened to forward wall 66 by an conventional means, but the preferred construction includes a plurality of thumbscrews 65, or the like, driven through apertures 67 in the rearward face of channel 66 and into receiving apertures (not shown) near the upper edge of wall 66.

A hinge 68 runs the full length of channel member 64 and may be fastened thereto by any conventional means. Hinge 68 is fastened to and supports lid 70. Lid 70 has a length approximating the distance between the truck bed's side walls 16 and 18, and a width approximating the distance between forward truck wall 66 and the "wall" formed by stake 52 and upstanding box panels 28 and 30. Lid 70 is preferably constructed of vacuum-formed ABS plastic and includes structural contours such as ridges and depressions (unidentified and unnumbered in the drawings) to enhance its rigidity.

Lid 70 is hingedly supported at the forward wall and adapted, when lowered, to seat atop rails 36 and 38 of the truck bed's side walls and, simultaneously, atop the top edges of the box panels. Strips of resilient foam 72, or the like, are disposed on the outer undersurfaces of lid 70 to act as cushions, and to aid in creating a good fit between the lid and rails 36 and 38. Outer downward-projecting, rigid side lips 74 and 76 are disposed on lid 70's undersurface, and are dimensioned so as to block any gap between the rails and lid when the lid is closed. A downward-projecting rearward lip 78 is dimensioned so as to cover the upper edges of box panels 28 and 30.

Figure 6:
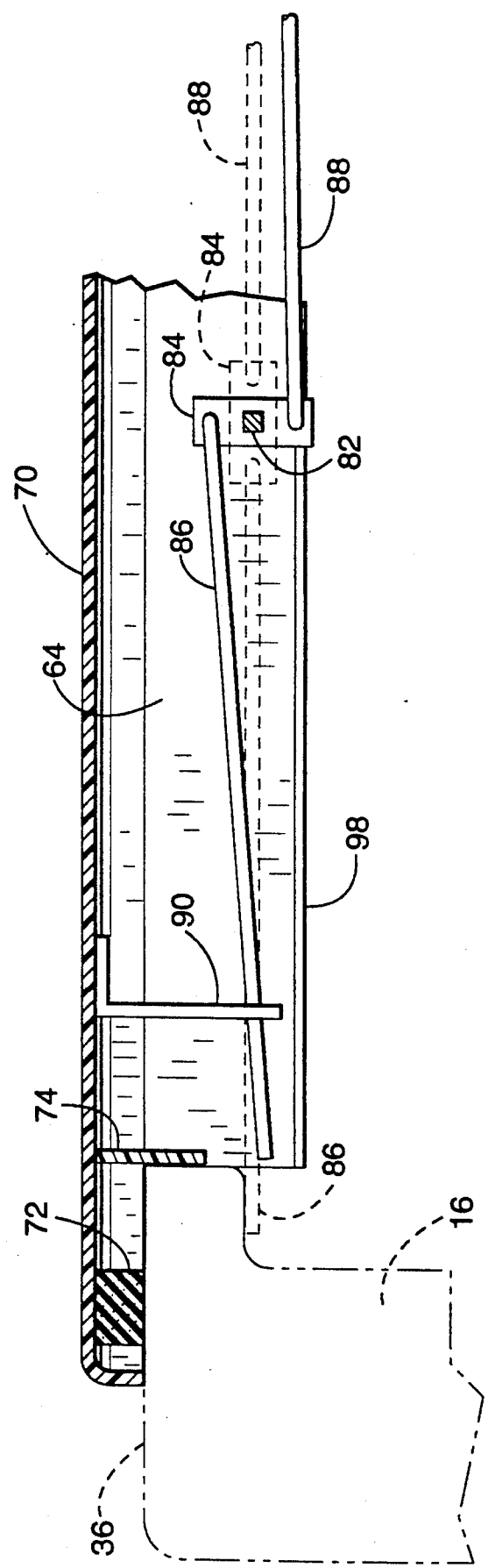
FIG. 6 is an enlarged sectional view of the storage box shown in FIG. 1, viewed on lines 6—6 thereof, and showing the lid's locking apparatus in an unlocked posture in solid lines, and in a locked posture in broken lines.

Lid 70 includes lock handle 80, which is preferably disposed toward one side of rearward lip 78 so one is able to reach it easily from the driver's side of the truck. Lock shaft 82 passes through rearward lip 78 supported by an appropriate bushing, or the like (not shown). Linkage plate 84 is mounted on that end of lock shaft 82 opposing handle 80, and is therefore disposed inside storage box 10. Linkage plate 84 has a pair of opposed apertures (unnumbered) that receive right-angled ends of right and left lock rods 86 and 88. The right-angled end of lock rods 86 and 88 are held into linkage plate 84 in any conventional fashion that lets them rotate freely. Right lock rod 86 is shorter and left rod is longer because handle 80 is disposed closer to the driver's side of the truck. The lock rods are supported near their outer termini by downward-projecting lock rod guides 90 and Thus, as lock handle 80 is turned, that motion is transferred to linkage plate 84, and rods 86 and 88 are selectively driven toward or away from the truck bed's side walls. Rods 86 and 88, and linkage plate 84, are of such dimensions that when lock handle 80 is rotated into a first position (shown in phantom lines in FIG. 6) the rods' outer termini project substantially beneath the rails 36 and 38, thereby preventing lid 70 from being raised. And, when lock handle 80 is rotated into a second position 90° from the first (shown in solid lines in FIG. 6), lock rods 86 and 88 are withdrawn from beneath rails 36 and 38, thereby permitting lid 70 to be freely raised.

To add stability to the upper edge of the wall formed by the box panels, cross member 94 is provided. Cross member 94 is affixed, via hinge 96 at its end most proximal to channel member 64, to the rigid, rearward-projecting lip 98 of the channel member. Cross member 94 has right and left opposing notches 100 and 102 at its distal end that are dimensioned to permit the cross member to engage the upper inner edges of the box panels. Thus, the shape and dimensions of the cross member's distal end closely match the H-shaped cross section of center stake 52. Cross member 94 may be swung up and down at will for access to the space within storage box 10, as when one desires to deposit a large object therein.

Right and left cap strips 104 and 106 have U-shaped cross-sections and nest atop top edges of their respective box panels 28 and 30, filling any gap between those top edges and the undersurface of lid 70. Cap strips 104 and 106 have equal lengths, their combined length being somewhat shorter than the distance between the inner faces of the truck's rails 36 and 38.

Center cap strip segment 108 has a cross-section identical to those of cap strips 104 and 106. It is fastened in a perpendicular orientation to cross member 94's distal end with conventional means such as nut 110 and bolt 112. Center cap strip segment 108 is positioned on cross member 94 so that when the cross member's distal end seats between the box panels, and the cross member's notches 100 and 102 engage the panels' upper inner edges, segment 108 receives the inner top edges of the box panels. Center cap strip segment 108's length is such that, when in place between cap strips 104 and 106, it keeps cap strips 104 and 106 apart so their outer ends abut the rails 36 and 38 of their respective side walls.

Use of the invention begins by one simply attaching right and left edge brackets 12 and 14 to the respective inner walls of a pickup truck's cargo box if the edge brackets are not already in place. Then, left and right box panels are placed in an upright orientation with their outer edges 32 and 34 seated in their respective edge brackets. This leaves a space between inner edges 56 and 58 of the box panels; center stake 52 is slipped into that space, and its pin 60 is inserted into the aperture in the floor of the cargo bed. Channel member 64 is placed atop the top edge of the truck bed's forward wall and thumb screws 65 are driven into the apertures adapted to receive them. As lid 70 and crossbar 94 are attached to the channel member, they are all put in place as part of the same operation. Finally, the crossbar is swung down to engage the box panels atop the center stake and the lid is swung down to cover the space defined by the truck bed walls and box panels. If desired, the lock apparatus may be operated to prevent the lid from being lifted.

The inventive truck storage box is disassembled by reversing the steps of assembly. Once disassembled, the truck storage box's components stow easily in minimal space.

The foregoing detailed disclosure of the inventive pickup truck storage box 10 is considered as only illustrative of the preferred embodiment of, and not a limitation upon the scope of, the invention. Those skilled in the art will envision many other possible variations of the structure disclosed herein that nevertheless fall within the scope of the following claims. And, alternative uses for this inventive pickup truck storage box may later be realized. Accordingly, the scope of the invention should be determined with reference to the appended claims, and not by the examples which have herein been given.

I claim:

1. A storage box kit for installation in a truck's cargo bed, comprising:
   a. right and left edge brackets, each said bracket being adapted to be fastened in a generally vertical orientation to opposing side walls of a truck bed;
   b. right and left box panels, said panels being generally planar and adapted to be disposed in a single plane generally perpendicular to said truck bed's side walls, an outer edge of each said panel being adapted to seat in its respective edge bracket;
   c. means adapted to be disposed between opposed inner edges of said box panels, said means being for separating said panels and thereby causing said panels' outer edges to remain securely mated with their respective edge brackets; and,
   d. a lid adapted to be removably seated atop top edges of said truck bed's forward and side walls, and atop top edges of said box panels.

2. The kit of claim 1, wherein each said edge bracket has a U-shaped cross-section.

3. The kit of claim 1, wherein each box panel has a length approximating half said truck bed's width.

4. The kit of claim 1, wherein an outer end of each said box panel is adapted to fit under an upper, inwardly-turned rail atop its respective, adjacent truck wall.

5. The kit of claim 1, wherein said separating means comprises a center stake having a width sufficient to fill a space between said panels' opposed inner edges when said panels'0 outer edges are securely mated with their respective edge brackets.

6. The kit of claim 5, wherein said center stake further includes a downward-projecting pin at its lower terminus, said pin being adapted to be received by an aperture in said truck's floor when said center stake is seated between said opposed inner edges of said box panels.

7. The kit of claim 5, wherein said center stake further includes a projection to aid in its being grasped.

8. The kit of claim 1, wherein each said box panel has a removable outer end portion including its outer edge, thereby permitting each said box panel to receive alternative outer end portions having differently-shaped outer edges.

9. The kit of claim 1, further including a cap strip having a generally U-shaped cross-section able to nest atop top edges of said box panels.

10. The kit of claim 1, further including an elongate cross-member adapted to be hingedly secured at its proximal end to a top edge of said forward wall whereby, when so attached, said cross-member's distal end will engage with upper inner edges of said box panels.

11. The kit of claim 10, wherein said cross-member includes opposing notches in said distal end thereof for engaging upper inner edges of said box panels.

12. The kit of claim 10, wherein said cross-member includes a cap strip segment perpendicular to its length fastened to its distal end, said cap strip having a generally U-shaped cross-section for nesting atop top edges of said box panels.

13. The kit of claim 1, wherein said lid is selectively lockable against removal from atop said top edges of said truck bed's forward and side walls, and atop said top edges of said box panels.

14. The kit of claim 1, wherein said lid is adapted to be hingedly secured to a top edge of said truck bed's forward wall.

15. The kit of claim 1, further including means for locking said lid in place atop a storage box constructed of said kit, wherein said locking means includes at least one selectively extensible and retractable member, an end of said member being adapted, upon extension, to engage means associated with at least one of said truck bed's side walls for receiving said member's ends.

16. The kit of claim 15, wherein said side wall-associated means said locking means is adapted to engage comprises an upper, inwardly-turned rail atop said truck bed's side wall.

17. A pickup truck with a cargo bed having a removable storage box, comprising, in combination:
   a. a pickup truck with a cargo bed defined by a floor, a forward wall and spaced-apart side walls;
   b. right and left edge brackets, each said bracket being fastened in a generally vertical orientation to opposing side walls of said truck bed;
   c. right and left upstanding box panels, said panels being generally planar and disposed in a single plane generally perpendicular to said truck bed's side walls, an outer edge of each said panel being seated in its respective edge bracket;
   d. means disposed between opposed inner edges of said box panels, said means separating said panels and thereby causing said panels' outer edges to remain securely mated with their respective edge brackets; and,
   e. a lid removably seated atop top edges of said truck bed's forward and side walls and, simultaneously, atop top edges of said upstanding box panels.

18. The combination of claim 17, wherein said floor is generally horizontal, and wherein said forward wall and said side walls are generally vertical and generally parallel to one another and generally perpendicular to said forward wall.

19. The combination of claim 17, wherein said side walls and said forward wall have top edges of substantially the same height above said floor.

20. The combination of claim 19, wherein top edges of said box panels reside at approximately the same height as top edges of said truck bed's forward and side walls.

21. The combination of claim 17, wherein each of said truck bed's side walls includes an upper, inwardly-turned rail, and wherein outer ends of said box panels fit snugly beneath said rails.

22. The combination of claim 17, wherein each said edge bracket has a U-shaped cross-section.

23. The combination of claim 17, wherein each box panel has a length approximating half said truck bed's width.

24. The combination of claim 17, wherein each said box panel has a removable outer end portion including its outer edge, thereby permitting each said box panel to receive alternative outer end portions having differently-shaped outer edges.

25. The combination of claim 17, wherein said separating means comprises a center stake having a width that fills a space between said panels' opposed inner edges, thereby their respective edge brackets.

26. The combination of claim 25, wherein said center stake further includes a downward-projecting pin at its lower terminus, and said truck's floor includes an aperture therein adapted to receive said pin when said center stake is seated between said opposed inner edges of said box panels.

27. The combination of claim 25, wherein said center stake further includes a projection to aid in its being grasped.

28. The combination of claim 17, further including a cap strip having a generally U-shaped cross-section nesting atop top edges of said box panels.

29. The combination of claim 17, further including an elongate cross-member hingedly secured at its proximal end to a top edge of said forward wall whereby said cross-member's distal end will engage with upper inner edges of said box panels.

30. The combination of claim 29, wherein said cross-member includes opposing notches in said distal end thereof for engaging upper inner edges of said box panels.

31. The combination of claim 29, wherein said cross-member includes a cap strip segment perpendicular to its length fastened to its distal end, said cap strip having a generally U-shaped cross-section for nesting atop top edges of said box panels.

32. The combination of claim 17, wherein said lid has a length approximating the distance between said truck bed's side walls and a width approximating the distance between said truck bed's forward wall and said upstanding box panels.

33. The combination of claim 17, wherein said lid is hingedly secured to a top edge of said truck bed's forward wall.

34. The combination of claim 17, wherein said lid is selectively lockable against removal from atop said top edges of said truck bed's forward and side walls, and atop said top edges of said upstanding box panels.

35. The combination of claim 17, further including means for locking said lid atop said security box, wherein said locking means includes at least one selectively extensible and retractable member, an end of said member being able, upon extension, to engage means associated with at least one of said truck bed's side walls for receiving said member's ends.

36. The combination of claim 35, wherein said side wall-associated means engaged by said locking means comprises an upper, inwardly-turned rail atop said truck bed's side wall.

* * * * *